United States Patent
Khan (10) Patent No.: US 11,635,321 B2
(45) Date of Patent: Apr. 25, 2023

(54) METHOD AND SYSTEM FOR SENSING A FLUID LEVEL ASSOCIATED WITH AN ENGINE

(71) Applicant: PRATT & WHITNEY CANADA CORP., Longueuil (CA)

(72) Inventor: Sarmad Khan, Mississauga (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 94 days.

(21) Appl. No.: 16/744,390

(22) Filed: Jan. 16, 2020

(65) Prior Publication Data

US 2021/0190569 A1 Jun. 24, 2021

Related U.S. Application Data

(60) Provisional application No. 62/951,584, filed on Dec. 20, 2019.

(51) Int. Cl.

| | |
|---|---|
| *G01F 23/80* | (2022.01) |
| *G01F 23/24* | (2006.01) |
| *H01H 36/02* | (2006.01) |
| *G01F 23/263* | (2022.01) |
| *F01M 11/12* | (2006.01) |
| *G01F 25/20* | (2022.01) |

(52) U.S. Cl.
CPC .......... *G01F 23/802* (2022.01); *F01M 11/12* (2013.01); *G01F 23/24* (2013.01); *G01F 23/266* (2013.01); *G01F 25/20* (2022.01); *H01H 36/02* (2013.01)

(58) Field of Classification Search
CPC .... G01F 25/0061; G01F 23/24; G01F 23/266; G01F 23/0069; G01F 23/26; G01F 23/263; G01F 23/546; G01F 23/62; G01F 23/72
See application file for complete search history.

(56) References Cited

U.S. PATENT DOCUMENTS

| | | | | |
|---|---|---|---|---|
| 3,747,407 A | * | 7/1973 | Wallman | G01F 23/263 73/304 C |
| 4,084,436 A | * | 4/1978 | Smitherman | G01F 23/70 73/313 |
| 4,147,050 A | | 4/1979 | Rubel et al. | |
| 4,417,473 A | * | 11/1983 | Tward | G01F 23/263 361/284 |
| 4,968,946 A | | 11/1990 | Maier | |

(Continued)

FOREIGN PATENT DOCUMENTS

WO WO-2006055006 A1 * 5/2006 .......... A61M 5/1684

*Primary Examiner* — John Fitzgerald
*Assistant Examiner* — Truong D Phan
(74) *Attorney, Agent, or Firm* — Norton Rose Fulbright Canada LLP (57) ABSTRACT

Methods and systems for sensing a fluid level associated with an engine are described. The method comprises generating an input signal and applying the input signal to a resistive portion and a capacitive portion of a fluid level sensing device, measuring a first varying output of the resistive portion of the fluid level sensing device through a first channel of a controller of the engine, measuring a second varying output of the capacitive portion of the fluid level sensing device through a second channel of the controller of the engine, and translating at least one of the first varying output and the second varying output into a level of fluid and outputting the level of fluid.

17 Claims, 5 Drawing Sheets

(56) References Cited

U.S. PATENT DOCUMENTS

| | | | | |
|---|---|---|---|---|
| 6,082,392 | A * | 7/2000 | Watkins, Jr. | B67D 7/002 137/557 |
| 10,175,085 | B2 | 1/2019 | Philiben | |
| 2012/0304761 | A1 * | 12/2012 | Miyagawa | G01F 23/36 73/304 C |
| 2018/0017430 | A1 * | 1/2018 | Aghili | B60K 15/03519 |
| 2019/0265715 | A1 * | 8/2019 | Ghannam | G01M 3/3245 |
| 2019/0360851 | A1 * | 11/2019 | Linton | H01C 10/32 |
| 2020/0080910 | A1 * | 3/2020 | Da Silva | F16L 55/46 |
| 2020/0191637 | A1 * | 6/2020 | Kaibel | G01F 23/263 |

* cited by examiner

METHOD AND SYSTEM FOR SENSING A FLUID LEVEL ASSOCIATED WITH AN ENGINE

CROSS-REFERENCE TO RELATED APPLICATIONS

This application claims the benefit of U.S. Provisional Patent Application No. 62/951,584 filed on Dec. 20, 2019, the contents of which are hereby incorporated by reference.

TECHNICAL FIELD

The application relates generally to fluid level sensing devices and, more particularly, to fluid level sensing devices associated with an engine, such as a gas turbine engine.

BACKGROUND OF THE ART

Fluid level sensing devices are used to monitor a level of fluid in a container, such as an oil tank associated with an engine. There are many physical and application variables that affect the selection of the optimal level monitoring method and system for the aerospace industry. Therefore, improvements are needed.

SUMMARY

In one aspect, there is provided a method for sensing a fluid level associated with an engine. The method comprises generating an input signal and applying the input signal to a resistive portion and a capacitive portion of a fluid level sensing device, measuring a first varying output of the resistive portion of the fluid level sensing device through a first channel of a controller of the engine, measuring a second varying output of the capacitive portion of the fluid level sensing device through a second channel of the controller of the engine, and translating at least one of the first varying output and the second varying output into a level of fluid and outputting the level of fluid.

In another aspect, there is provided a system for sensing a fluid level associated with an engine. The system comprises a processing unit and a non-transitory computer readable medium having stored therein program code. The program code is executable by the processing unit for generating an input signal and applying the input signal to a resistive portion and a capacitive portion of a fluid level sensing device, measuring a first varying output of the resistive portion of the fluid level sensing device through a first channel of a controller of the engine, measuring a second varying output of the capacitive portion of the fluid level sensing device through a second channel of the controller of the engine, and translating at least one of the first varying output and the second varying output into a level of fluid and outputting the level of fluid.

In a further aspect, there is provided a fluid measuring system for an engine. The system comprises a fluid level sensing device having a resistive portion and a capacitive portion, and an engine controller coupled to the fluid level sensing device. The engine controller has a first channel and a second channel and is configured for generating an input signal and applying the input signal to the resistive portion and the capacitive portion of the fluid level sensing device, measuring a first varying output of the resistive portion of the fluid level sensing device through the first channel, measuring a second varying output of the capacitive portion of the fluid level sensing device through the second channel, and translating at least one of the first varying output and the second varying output into a level of fluid and outputting the level of fluid.

DESCRIPTION OF THE DRAWINGS

Reference is now made to the accompanying figures in which.

DETAILED DESCRIPTION

There is described herein methods and systems for sensing a fluid level associated with an engine, such as an aircraft engine or an engine used in an industrial setting. In some embodiments, the fluid is oil. Other types of fluids, such as fuel and water, are also applicable.

Figure 1:
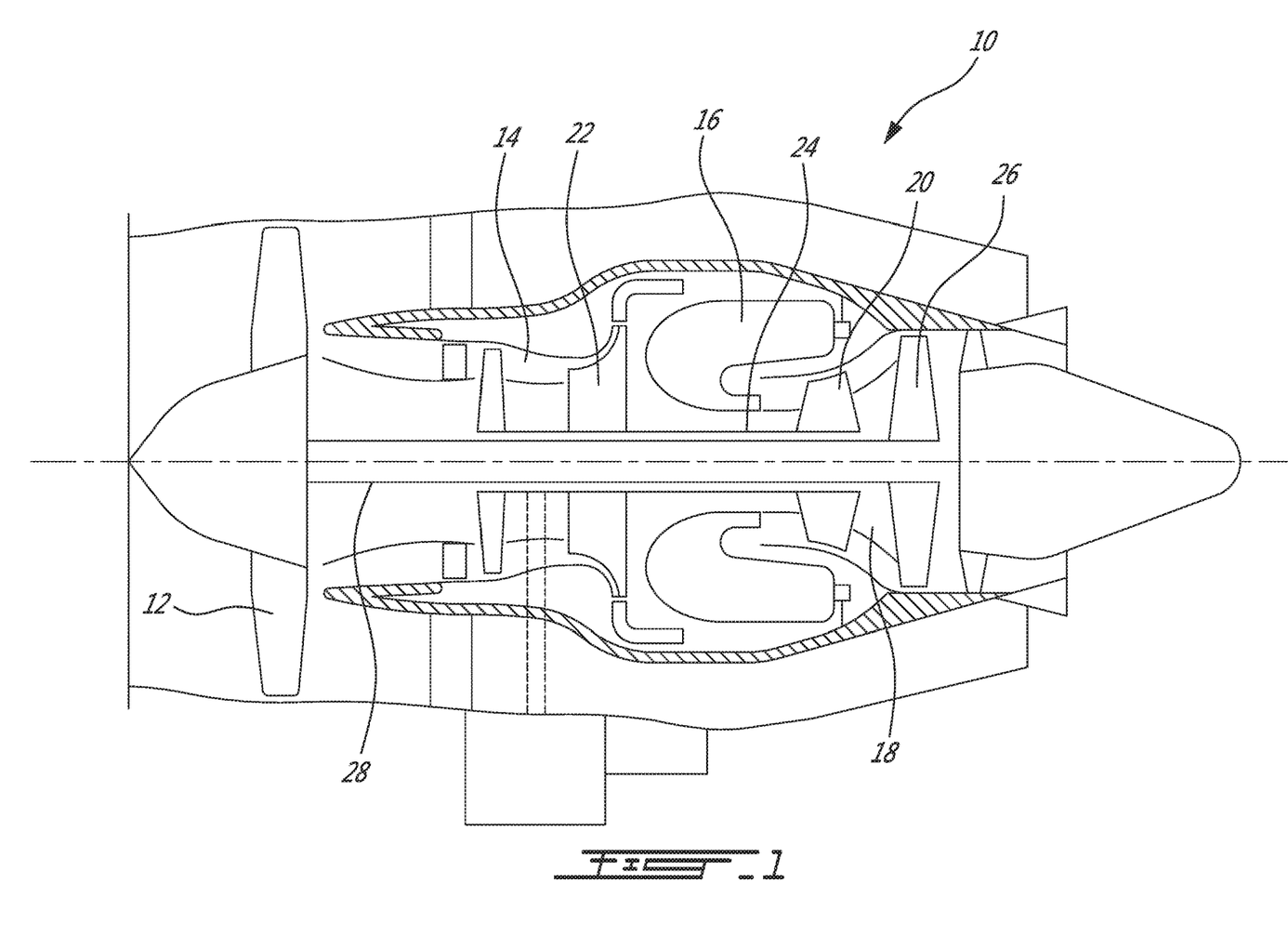
FIG. 1 is a schematic cross-sectional view of an example gas turbine engine.

The engine may be a gas turbine engine, such as a turbofan engine, a turboshaft engine, a turboprop engine, and the like. FIG. 1 illustrates an example gas turbine engine 10 of a type provided for use in subsonic flight, generally comprising in serial flow communication, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. High pressure rotor(s) 20 of the turbine section 18 are drivingly engaged to high pressure rotor(s) 22 of the compressor section 14 through a high pressure shaft 24. Low pressure rotor(s) 26 of the turbine section 18 are drivingly engaged to the fan rotor 12 and to other low pressure rotor(s) (not shown) of the compressor section 14 through a low pressure shaft 28 extending within the high pressure shaft 24 and rotating independently therefrom.

Although a gas turbine engine 10 is illustrated, the systems and methods for fluid level sensing may apply to any other suitable engine. For example, diesel engines, typical car engines (internal combustion engine), or the like, may apply.

Figure 2:
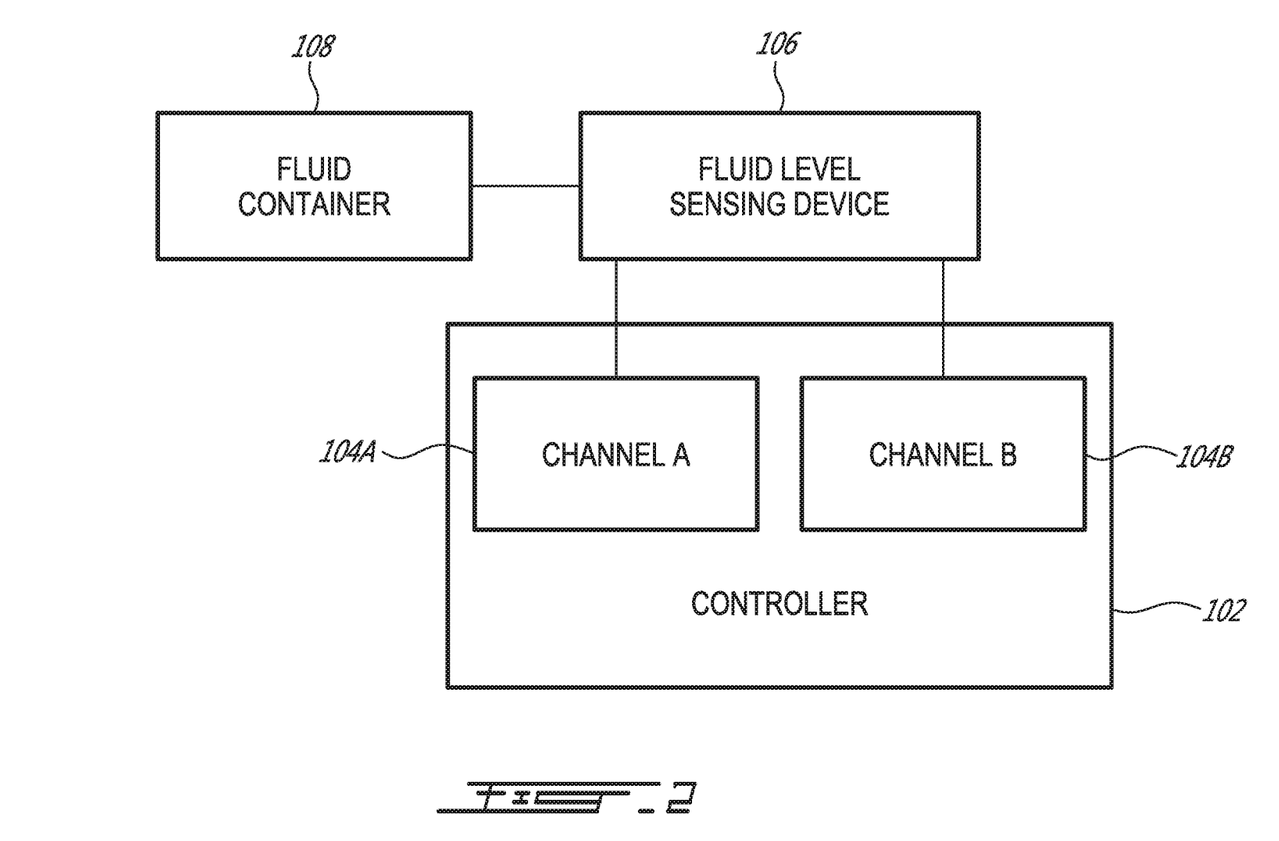
FIG. 2 is a block diagram of an example fluid level sensing system.

Referring to FIG. 2, there is illustrated a controller 102, which may be an engine controller such as an Electronic Engine Controller (EEC) that forms part of a Full Authority Digital Engine Control (FADEC), for controlling the operation and performance of the engine 10. The controller 102 has at least two channels 104A, 104B. More than two channels may also be provided. The controller 102 is operatively coupled to a fluid level sensing device 106, which may be used to monitor any level of fluid (e.g. water, oil, or the like) in any suitable vessel or container 108 that defines a volume of the fluid. In one embodiment, the fluid level sensing device 106 monitors a level of oil in an oil tank of the engine 10.

The fluid level sensing device 106 is a hybrid sensing device having a resistive portion and a capacitive portion. Channel A 104A of the controller 102 measures a varying output of the resistive portion of the fluid level sensing device 106. Channel B 104B of the controller 102 measures a varying output of the capacitive portion of the fluid level sensing device 106. Note that the channels 104A, 104B may be reversed such that the capacitive portion is measured by Channel A 104A and the resistive portion is measured by Channel B 104B. However in both case, the varying outputs of the resistive and capacitive portions of the fluid level sensing device 106 may be measured simultaneously, as the capacitive and resistive portions of the fluid level sensing device 106 are independent physical sensing elements, each communicating with one of the two channels 104A, 104B of the controller 102. Each one of the two channels 104A, 104B of the controller 102 may determine a fluid level of the fluid container 108, thus providing redundancy in case either one of the two channels 104A, 104B is lost.

Figure 3:
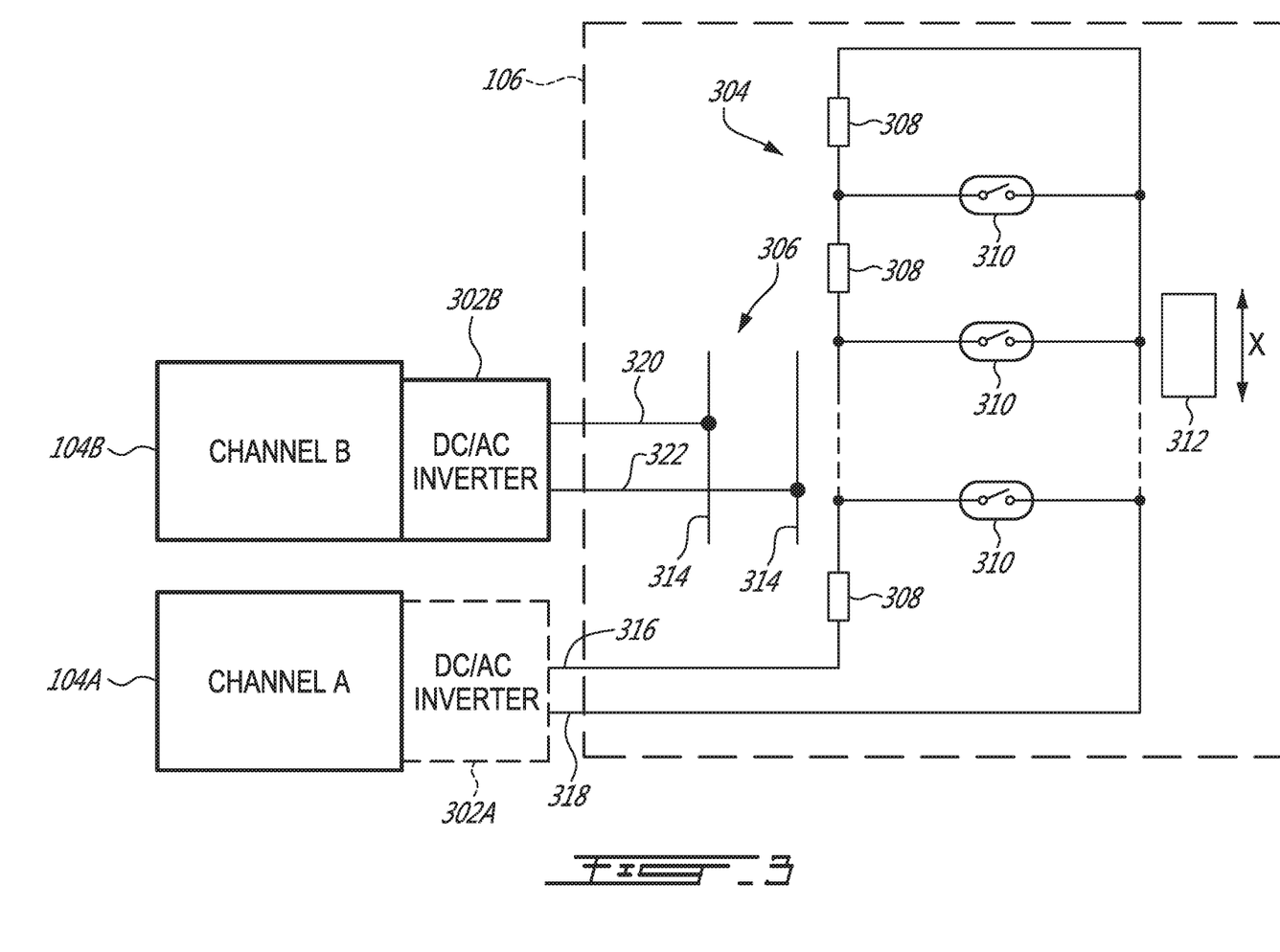
FIG. 3 is a schematic diagram of an example embodiment of a fluid level sensing device for the system of FIG. 2.

Referring to FIG. 3 in addition to FIG. 2, an example embodiment of the fluid level sensing device 106 is illustrated. A resistive portion 304 comprises a plurality of resistors 308 that are connected through magnetic switches 310 (e.g. reed switches). The magnetic switches 310 are illustratively each actuatable between an open and closed position (or state) and are nominally open. One end of each switch 310 is connected to a resistor 308 and another end of each switch 310 is connected to a common node (i.e. terminal 318). Any suitable number of resistors 308 and switches 310 may apply depending on the characteristics of the fluid level sensing device 106, such as the sensing range for which the device 106 is designed.

A floating device 312 (e.g. a ring float) is configured to move vertically (i.e. rise or lower) along an axis X with the fluid level in the fluid container 108. In particular, as the fluid container 108 (e.g. the oil tank) is replenished (e.g. upon engine shutdown) and the level of fluid in the fluid container 108 (e.g. the level of oil in the engine's oil tank) increases, the floating device 312 moves up along axis X. As the fluid container 108 is drained (e.g. upon engine operation) and the level of fluid in the fluid container 108 decreases, the floating device 312 moves down along axis X.

The floating device 312 carries a magnetic element, such as one or more permanent magnets. When the floating device 312 moves adjacent to a given one of the switches 310, the given switch 310 is activated (i.e. closes) under the magnetic force generated by the magnetic element, thereby completing the circuit between the terminals 316, 318 and providing a path for electrical current to travel through the applicable resistors 308. When the floating device 312 moves away from the given switch 310, the switch 310 is deactivated (i.e. opens). In some embodiments, only one switch 310 is activated at any given time. Thus, as the floating device 312 is moved upwardly and downwardly, different ones of the switches 310 are closed by the proximity of the magnetic element, thereby providing a complete circuit through a different number of resistors 308 to provide a varying voltage or current value, as a function of a constant current or voltage applied across terminals 316, 318 of the resistive portion 304. Although the terminals 316, 318 are shown to be at a bottom end of the resistive portion 304, they may be provided at a top end.

In some embodiments, a constant current (I) is supplied to the resistive portion 304 across the terminals 316, 318, and voltage (V) is measured. In some embodiments, a constant voltage (V) is supplied to the resistive portion 304 across the terminals 316, 318 and current (I) is measured. A change in impedance in the resistive portion, caused by the change in the fluid level, will cause a change in the measured output based on:

$$\text{impedance} = \frac{V}{I}$$

The varying output of the sensing device 106, either current or voltage, across terminals 316, 318 may be used to determine the fluid level using a previously determined correlation between the output and the fluid level. For example, a lookup table may be provided that associates voltage or current output values with corresponding fluid levels.

In some embodiments, a capacitive portion 306 of the fluid sensing device 106 comprises a pair of capacitive plates 314 having a dielectric medium therebetween. The dielectric medium is the fluid in the container 108. Any material having the desired capacitive properties may be used for the capacitive plates 314. In some embodiments, the capacitive plates 314 are formed by a pair of concentric cylinders, whereby a first plate 314 forms an outer shell of the sensing device 106 and a second plate forms an inner shell of the sensing device 106. The fluid fills the space between the inner and outer shells of the device 106. As the fluid level rises and falls, the dielectric of the medium changes, which causes the capacitance C to vary as a function of:

$$C = \varepsilon_0 \varepsilon_r \frac{A}{d}$$

where A is the area of the capacitive plates 314, d is the distance between the capacitive plates 314, $\varepsilon_0$ is the permittivity for free space, and $\varepsilon_r$ is the permittivity of the dielectric medium between the capacitive plates 314. Various values may be used for area A and distance d in accordance with different practical implementations.

As the capacitance C varies, so does the impedance of the capacitive portion 306, based on:

$$\text{impedance} = \frac{1}{2 * \pi * F * C}$$

where F is the input frequency of an AC excitation signal applied across the terminals 320, 322. In some embodiments, a constant current (I) is supplied to the capacitive portion 306 across the terminals 320, 322, and voltage (V) is measured. In some embodiments, a constant voltage (V) is supplied to the capacitive portion 306 across the terminals 320, 322 and current (I) is measured. The varying output of the sensing device 106 across terminals 320, 322, either current or voltage, may be used to determine the fluid level using a previously determined correlation between the output and the fluid level.

In some embodiments, at least one DC/AC inverter is provided in order to convert a DC input signal into an AC excitation signal for the capacitive portion 306 of the fluid level sensing device 106. Any design for converting a DC signal into an AC signal may be used. The DC input signal is generated by the controller 102 or another source and converted into the AC excitation signal by the DC/AC inverter. The DC/AC inverter may be inside the controller 102 or outside of the controller 102. The DC/AC inverter may be integrated inside the fluid sensing device 106 or provided as a separate component therefrom.

In the example illustrated in FIG. 3, a first DC/AC inverter 302A is coupled to channel A 104A of the controller 102 and connected to the fluid level sensing device 106 at terminals 316, 318. A second DC/AC inverter 302B is coupled to channel B 104B of the controller 102 and connected to the fluid level sensing device 106 at terminals 320, 322. Although unnecessary for the resistive portion 304 of the fluid level sensing device 106, the DC/AC inverter 302A may be provided so as to have the same input/outputs for both channels 104A, 104B of the controller 102, and to allow the two channels 104A, 104B to be used interchangeably. In an embodiment where the DC/AC inverter is provided separately from the controller 102, the first DC/AC inverter 302A may be omitted as the resistive portion 304 of the fluid level sensing device 106 may operate with a DC signal as input.

The capacitive portion 306 of the fluid level sensing device 106 may operate with only two input/outputs. The resistive portion 304 may be used as a reference to calibrate the capacitive portion 306, for example if the fluid grade/type is changed during servicing and no calibration is done. Indeed, in some embodiments, instead of having a third input/output communicating with an independent capacitor which always stays in the fluid (i.e. a compensating capacitor), the resistive portion 304 may be used to calibrate the capacitive portion 306. In such an embodiment, the capacitive portion 306 and the resistive portion 304 use common inputs/outputs, avoiding the need for a purely capacitive input/output which is incapable of reading resistive loads. It will be understood that the fluid level sensing device 106 may still be used in a redundant manner in-flight.

The resistive portion 304 of the fluid level sensing device 106 comprises moving parts, such as the floating device 312 and the switches 310. An obstruction to the floating device 312 or a demagnetization thereof can render the resistive portion 304 inoperative. In contrast, the capacitive portion 306 has no moving parts and is thus less susceptible to such failures. The hybrid fluid level sensing device 106 also benefits from saved space provided by having only one portion thereof include resistors and switches, while still allowing duplex functionality.

It will be understood that the example embodiments of the resistive portion 304 and the capacitive portion 306 of the fluid level sensing device 106 illustrated in FIG. 3 are specific and non-limiting examples. Any known or other design for measuring a varying voltage or current across a resistive load and/or a capacitive load may be used.

Figure 4:
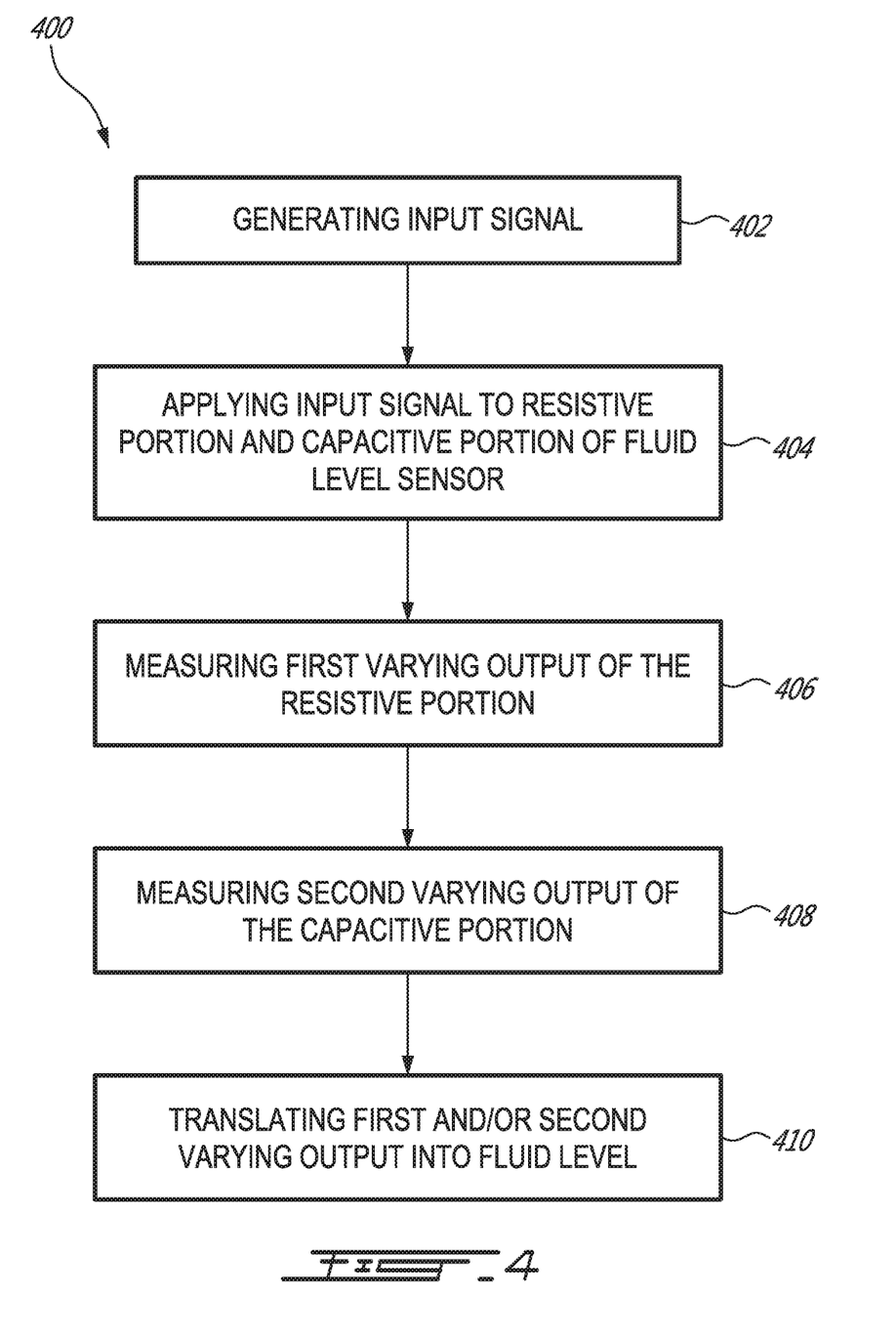
FIG. 4 is a flowchart of an example method for fluid level sensing.

Referring to FIG. 4, there is illustrated a flowchart of an example method 400 for sensing a fluid level associated with an engine, such as engine 10. In some embodiments, the method 400 is performed by the controller 102.

At step 402, an input signal is generated. The input signal may be generated by the controller 102, by a channel 104A, 104B of the controller 102, or by an external source. In some embodiments, a single input signal is generated and provided to each one of the channels 104A, 104B of the controller 102. In some embodiments, separate input signals are generated within each channel 104A, 104B of the controller 102. In some embodiments, the input signal is generated as an AC signal. In some embodiments, the input signal is generated as a DC signal and converted into an AC signal. In some embodiments, a first input signal is generated as a DC input signal, and a second input signal is generated as an AC input signal. Various embodiments may apply depending on practical implementations.

At step 404, the input signal is applied to the resistive portion and to the capacitive portion of the fluid level sensing device. It will be understood that the input signal applied to the capacitive portion of the fluid level sensing device is an AC signal, and that the input signal applied to the resistive portion of the fluid level sensing device is an AC signal or a DC signal. The resistive and capacitive portions of the fluid level sensing device each have their respective terminals to which the input signal may be applied.

At step 406, a varying output of the resistive portion is measured, for example across terminals 316, 318. At step 408, a varying output of the capacitive portion 306 is measured, for example across terminals 320, 322. Steps 406 and 408 may be performed concurrently or sequentially, in any order. The varying output may be a varying current, a varying voltage, or a varying impedance (resistive or capacitive, as applicable). In some embodiments, if the fluid type is subject to change, for example from oil to water, or from a first grade of oil to a second grade of oil, a calibration step may be added to the method 400, whereby the capacitive portion 306 is calibrated using the resistive portion 304.

At step 410, the first and/or second varying output is translated into a level of fluid. For example, a predetermined relationship between the output parameter (or a parameter calculated from the output parameter) and the fluid level is used to determine the actual fluid level. The relationship may be established using simulations and/or testing and corresponding values may be stored in a storage medium accessible by the controller 102. Alternatively, the controller 102 may determine the fluid level by applying the relationship in real-time, using one or more equations. Other embodiments may apply depending on practical implementations.

In some embodiments, the method 400 is performed entirely inside the controller 102, including any conversion of the input signal to an AC excitation signal.

In some embodiments, a DC input signal is converted into an AC input signal in both channels 104A, 104B of the controller 102 and each channel 104A, 104B of the controller 102 is connected to the fluid level sensing device 106 via two input/outputs.

In some embodiments, the channel connected to the capacitive portion 306 of the fluid level sensing device 106 is calibrated using the channel connected to the resistive portion 304 of the fluid level sensing device 106.

In some embodiments, the conversion of a DC input signal into an AC input signal is performed outside of the controller 102, either inside the fluid level sensing device 106 or outside therefrom.

In some embodiments, the fluid is oil and the controller is a dual channel EEC.

In some embodiments, the fluid level sensing device 106 comprises a single housing for the resistive portion 304 and the capacitive portion 306.

In some embodiments, both resistive and capacitive loads of the fluid level sensing device 106 are monitored simultaneously.

In some embodiments, the resistive portion of the fluid level sensing device is used as a primary measurement and the capacitive portion of the fluid level sensing device is used to validate the primary measurement. In some embodiments, the capacitive portion of the fluid level sensing device is used as a primary measurement and the resistive portion of the fluid level sensing device is used to validate the primary measurement.

Figure 5:
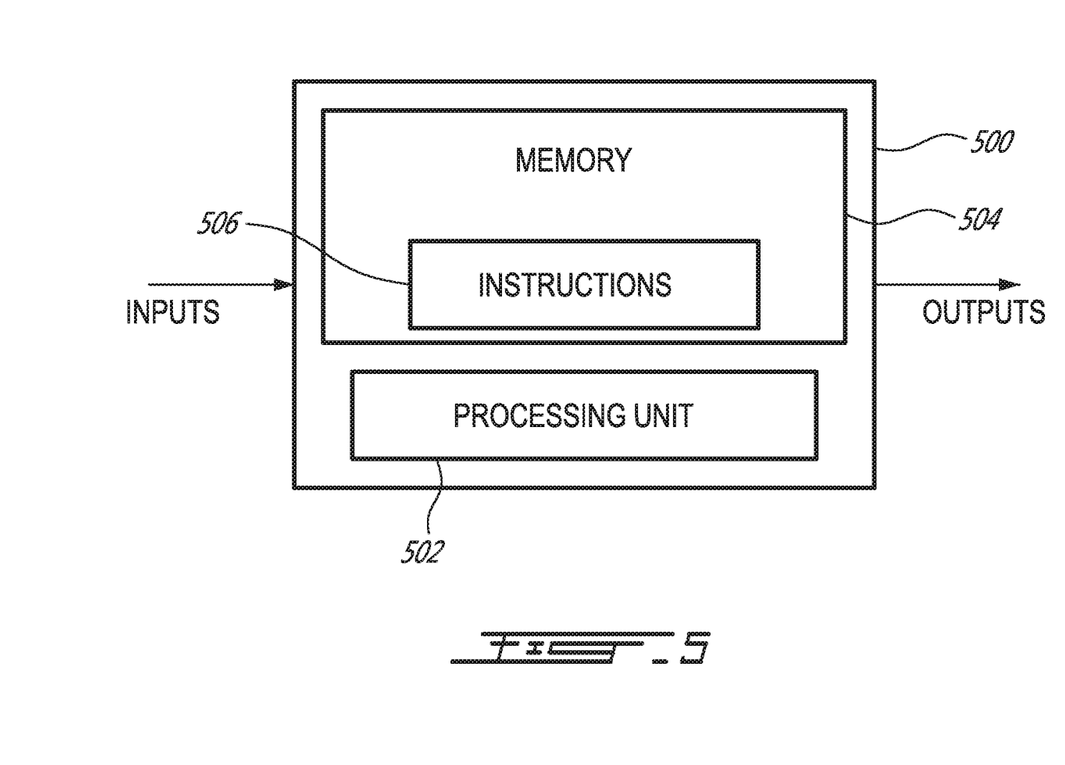
FIG. 5 is a block diagram of an example computing device for performing the method of FIG. 4.

FIG. 5 is an example embodiment of a computing device 500 for implementing the method 400 for sensing the fluid level as described above. In some embodiments, the controller 102 is implemented using one or more computing device 500. The computing device 500 comprises a processing unit 502 and a memory 504 which has stored therein computer-executable instructions 506. The processing unit 502 may comprise any suitable devices configured to cause a series of steps to be performed such that instructions 506, when executed by the computing device 500 or other programmable apparatus, may cause the functions/acts/steps specified in the method 400 described herein to be executed. The processing unit 502 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 504 may comprise any suitable known or other machine-readable storage medium. The memory 504 may comprise a non-transitory computer readable storage medium, for example, but not limited to, an electronic, magnetic, optical, electromagnetic, infrared, or semiconductor system, apparatus, or device, or any suitable combination of the foregoing. The memory 504 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 504 may comprise any storage means (e.g., devices) suitable for retrievably storing machine-readable instructions 506 executable by processing unit 502.

It should be noted that the computing device 500 may be implemented as part of a FADEC or other similar device, including an electronic engine control (EEC), engine control unit (EUC), engine electronic control system (EECS), and the like. In addition, it should be noted that the techniques described herein can be performed by a computing device 500 substantially in real-time.

The methods and systems for sensing a fluid level as described herein may be implemented in a high level procedural or object oriented programming or scripting language, or a combination thereof, to communicate with or assist in the operation of a computer system, for example the computing device 500. Alternatively, the methods and systems for sensing a fluid level may be implemented in assembly or machine language. The language may be a compiled or interpreted language. Program code for implementing the methods and systems for sensing a fluid level may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for sensing a fluid level may also be considered to be implemented by way of a non-transitory computer-readable storage medium having a computer program stored thereon. The computer program may comprise computer-readable instructions which cause a computer, or more specifically the processing unit 502 of the computing device 500, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, software modules may be combined or separated in different manners in order to perform the steps of the method 400, or the specific circuits used to measure the capacitive and/or resistive load may vary. Yet further modifications could be implemented by a person of ordinary skill in the art in view of the present disclosure, which modifications would be within the scope of the present technology.

The invention claimed is:

1. A method for sensing a fluid level associated with an engine, the method comprising:
   generating a direct current (DC) input signal, converting the DC input signal into an alternating current (AC) excitation signal, applying one of the DC input signal and the AC excitation signal to a resistive portion of a fluid level sensing device, and applying the AC excitation signal to a capacitive portion of the fluid level sensing device;
   measuring, through a first channel of a controller of the engine, a first varying output of the resistive portion of the fluid level sensing device, the first channel having only two controller terminals operatively coupling the controller to the resistive portion, and simultaneously measuring, through a second channel of the controller of the engine, a second varying output of the capacitive portion of the fluid level sensing device, the second channel having only two controller terminals operatively coupling the controller to the capacitive portion; and
   translating, at the controller of the engine, the first varying output and the second varying output into a level of fluid and outputting the level of fluid.

2. The method of claim 1, wherein the DC input signal is converted into the AC excitation signal inside the controller of the engine.

3. The method of claim 1, wherein the DC input signal is converted into the AC excitation signal for the first channel and for the second channel.

4. The method of claim 1, further comprising calibrating the capacitive portion of the fluid level sensing device using the resistive portion.

5. The method of claim 1, wherein measuring a first varying output of the resistive portion comprises applying a constant current and measuring an output voltage.

6. The method of claim 1, wherein measuring a second varying output of the capacitive portion comprises applying a constant current and measuring an output voltage.

7. The method of claim 1, wherein the resistive portion of the fluid level sensing device comprises a ladder of reed switches.

8. The method of claim 1, wherein the capacitive portion of the fluid level sensing device comprises a pair of capacitive plates separated by a spacing that receives the fluid therebetween.

9. A system for sensing a fluid level associated with an engine, the system comprising:
- a processing unit; and
- a non-transitory computer readable medium having stored therein program code executable by the processing unit for:
  - generating a direct current (DC) input signal, converting the DC input signal into an alternating current (AC) excitation signal, applying one of the DC input signal and the AC excitation signal to a resistive portion of the fluid level sensing device, and applying the AC excitation signal to a capacitive portion of the fluid level sensing device;
  - measuring, through a first channel of a controller of the engine, a first varying output of the resistive portion of the fluid level sensing device, the first channel having only two controller terminals operatively coupling the controller to the resistive portion, and simultaneously measuring, through a second channel of the controller of the engine, a second varying output of the capacitive portion of the fluid level sensing device, the second channel having only two controller terminals operatively coupling the controller to the capacitive portion; and
  - translating, at the controller of the engine, the first varying output and the second varying output into a level of fluid and outputting the level of fluid.

10. The system of claim 9, wherein the DC input signal is converted into the AC excitation signal for the first channel and for the second channel.

11. The system of claim 9, wherein the program code is further executable for calibrating the capacitive portion of the fluid level sensing device using the resistive portion.

12. The system of claim 9, wherein measuring a first varying output of the resistive portion comprises applying a constant current and measuring an output voltage.

13. The system of claim 9, wherein measuring a second varying output of the capacitive portion comprises applying a constant current and measuring an output voltage.

14. The system of claim 9, wherein the resistive portion of the fluid level sensing device comprises a ladder of reed switches.

15. The system of claim 9, wherein the capacitive portion of the fluid level sensing device comprises a pair of capacitive plates separated by a spacing that receives the fluid therebetween.

16. A fluid measuring system for an engine, the system comprising:
- a fluid level sensing device having a resistive portion and a capacitive portion; and
- an engine controller coupled to the fluid level sensing device, the engine controller having a first channel operatively coupling the engine controller to the resistive portion of the fluid level sensing device, the first channel having only two controller terminals operatively coupling the engine controller to the resistive portion, and a second channel operatively coupling the engine controller to the capacitive portion of the fluid level sensing device, the second channel having only two controller terminals operatively coupling the engine controller to the capacitive portion, and the engine controller configured for:
  - generating a direct current (DC) input signal, converting the DC input signal into an alternating current (AC) excitation signal, applying one of the DC input signal and the AC excitation signal to the resistive portion of the fluid level sensing device, and applying the AC excitation signal to the capacitive portion of the fluid level sensing device;
  - measuring a first varying output of the resistive portion of the fluid level sensing device through the first channel, and simultaneously measuring a second varying output of the capacitive portion of the fluid level sensing device through the second channel; and
  - translating the first varying output and the second varying output into a level of fluid and outputting the level of fluid.

17. The fluid measuring system of claim 16, wherein the fluid level sensing device comprises a single housing for the resistive portion and the capacitive portion.

* * * * *